United States Patent [19]

Kim

[11] Patent Number: 5,691,930
[45] Date of Patent: Nov. 25, 1997

[54] BOOTH ENCODER IN A BINARY MULTIPLIER

[75] Inventor: Young-Joon Kim, Seoul, Rep. of Korea

[73] Assignee: Daewoo Electronics, Co., Ltd., Seoul, Rep. of Korea

[21] Appl. No.: 514,048

[22] Filed: Aug. 11, 1995

[30] Foreign Application Priority Data

Aug. 12, 1994 [KR] Rep. of Korea .............. 94-19847

[51] Int. Cl.[6] ............................................. G06F 7/52
[52] U.S. Cl. .................... 364/760; 364/754; 364/757; 364/759
[58] Field of Search ..................... 364/754–760

[56] References Cited

U.S. PATENT DOCUMENTS

| | | | |
|---|---|---|---|
| 4,807,175 | 2/1989 | Tokumaru et al. | 364/760 |
| 4,972,362 | 11/1990 | Elkind et al. | 364/760 |
| 5,231,415 | 7/1993 | Hagihara | 364/760 |
| 5,251,167 | 10/1993 | Simmonds et al. | 364/760 |
| 5,291,431 | 3/1994 | Ho et al. | 364/760 |
| 5,325,320 | 6/1994 | Chiu | 364/760 |
| 5,325,321 | 6/1994 | Ishida | 364/760 |

*Primary Examiner*—Reba I. Elmore
*Assistant Examiner*—Emmanuel L. Moise
*Attorney, Agent, or Firm*—Pennie & Edmonds, LLP

[57] ABSTRACT

A partial product generator in a binary multiplier for multiplying a parallel n-bit binary multiplier and a parallel m-bit binary multiplicand comprises n/2 (n being an even integer) or (n+1)/2 (n being an odd integer) number of Booth encoders, each of which generates a partial product and includes a first inverter for inverting a first two-bit extended, i.e., m+2 bits, multiplicand (ATO), a second inverter for inverting a second two-bit extended, i.e., m+2 bits, multiplicand (BTO), a first multiplexer for selecting one of the first and the second two-bit extended, inverted m+2 bit multiplicands, a plus "1" logic for adding a binary "1" to the m+2 bit binary number (CT) selected from the first multiplexer and a second multiplexer for selecting the first extended m+2 bit multiplicand, the second extended m+2 bit multiplicand or the added m+2 bit binary number, to thereby produce the partial product, wherein the selection operation of the first and the second multiplexers is controlled by a selection code derived from the n-bit multiplier.

1 Claim, 7 Drawing Sheets

FIG. 4A

| Signal | | | | | | | | | | | |
|---|---|---|---|---|---|---|---|---|---|---|---|
| A(8:0) | 000 | 01D | 09B | 101 | 0AB | 178 | 00A | 180 | 1A1 | 001 | |
| X(8:0) | 000 | 01A | 04A | 123 | 13D | 0A8 | 167 | 11A | 16F | 112 | |
| S1(2:0) | 0 | 4 | 6 | 4 | 2 | 0 | 6 | 4 | 6 | 4 | |
| AT0(10:0) | 000 | 01D | 7CD | 09B | 701 | 0AB | 778 | 00A | 780 | 7A1 | 001 |
| BT0(10:0) | 000 | 03A | 79A | 136 | 602 | 156 | 6F0 | 014 | 700 | 742 | 002 |
| ATT(10:0) | 7FF | 7E2 | 032 | 764 | 0FE | 754 | 087 | 7F5 | 07F | 05E | 7FE |
| BTT(10:0) | 7FF | 7C5 | 065 | 6C9 | 1FD | 6A9 | 10F | 7EB | 0FF | 0BD | 7FD |
| CT(10:0) | 000 | 7C5 | 032 | 6C9 | 1FD | 000 | 1FD | 0FF | 7F5 | 05E | 7FD |
| TMP1(10:0) | 000 | 7C6 | 033 | 6CA | 1FE | 0AB | 000 | 7F6 | 100 | 05F | 7FE |

FIG. 4B

| Signal | | | | | | | | | | | | |
|---|---|---|---|---|---|---|---|---|---|---|---|---|
| A(8:0) | 000 | 01D | 09B | 0AB | 178 | 00A | 1A1 | 001 |
| X(8:0) | 000 | 01A | 04A | 012 | 13D | 0A8 | 167 | 11A | 16F | 112 |
| S2(2:0) | 0 | 5 | 1 | 5 | 6 | 4 | 3 | 5 | 7 | 1 |
| ATO(10:0) | 000 | 01D | 7CD | 09B | 701 | 0AB | 778 | 00A | 780 | 7A1 | 001 |
| BTO(10:0) | 000 | 03A | 79A | 136 | 602 | 156 | 6F0 | 014 | 700 | 742 | 002 |
| ATT(10:0) | 7FF | 7E2 | 032 | 764 | 0FE | 754 | 087 | 7F5 | 07F | 05F | 7FE |
| BTT(10:0) | 7FF | 7C5 | 065 | 6C9 | 1FD | 6A9 | 10F | 7EB | 0FF | 0BD | 7FD |
| CT(10:0) | 000 | 7E2 | 000 | 764 | 000 | 754 | 10F | 7EF | 000 | 000 |
| TMP2(10:0) | 000 | 7E3 | 7CD | 765 | 701 | 755 | 110 | 014 | 080 | 000 | 001 |

FIG. 4C

| | | | | | | | | | | | |
|---|---|---|---|---|---|---|---|---|---|---|---|
| A(8:0) | 000 | 01D | 09B | 101 | 0AB | 178 | 00A | 180 | 1A1 | 001 | |
| X(8:0) | 000 | 01A | 04A | 012 | 13D | 0A8 | 167 | 11A | 16F | 112 | |
| S3(2:0) | 0 | 3 | 4 | 1 | 2 | 7 | 5 | 4 | 3 | 5 | 2 |
| AT0(10:0) | 000 | 01D | 7CD | 09B | 701 | 0AB | 778 | 00A | 780 | 7A1 | 001 |
| BT0(10:0) | 000 | 03A | 79A | 136 | 602 | 156 | 6F0 | 014 | 700 | 742 | 002 |
| ATT(10:0) | 7FF | 7E2 | 032 | 764 | 0FE | 754 | 087 | 7F5 | 07F | 05F | 7FE |
| BTT(10:0) | 7FF | 7C5 | 065 | 6C9 | 1FD | 6A9 | 10F | 7EB | 0FF | 0BD | 7FD |
| CT(10:0) | 000 | 065 | 000 | | | 087 | | 7EB | 0FF | 000 | 05E | 000 |
| TMP3(10:0) | 000 | 03A | 066 | 09B | 701 | 000 | 068 | 7EC | 700 | 05F | 001 |

FIG. 4D

| Signal | | | | | | | | | |
|---|---|---|---|---|---|---|---|---|---|
| A(8:0) | 000 | 01D | 1CD | 09B | 101 | 0AB | 178 | 00A | 180 | 1A1 | 001 |
| X(8:0) | 000 | 01A | 123 | 04A | 012 | 13D | 0A8 | 167 | 11A | 16F | 112 |
| S4(2:0) | 0 | 1 | 2 | 0 | 1 | 5 | 3 | 0 | 3 | 0 |
| ATO(10:0) | 000 | 01D | 7CD | 09B | 701 | 0AB | 778 | 00A | 780 | 7A1 | 001 |
| BTO(10:0) | 000 | 03A | 79A | 136 | 602 | 156 | 6F0 | 014 | 700 | 742 | 002 |
| ATT(10:0) | 7FF | 7E2 | 032 | 764 | 0FE | 754 | 087 | 7F5 | 07F | 05E | 7FE |
| BTT(10:0) | 7FF | 7C5 | 065 | 6C9 | 1FD | 6A9 | 10F | 7EB | 0FF | 0BD | 7FD |
| CT(10:0) | 000 | 087 | 000 |
| TMP4(10:0) | 000 | 7CD | 09B | 000 | 0AB | 088 | 014 | 000 | 742 | 000 |

FIG. 4E

| | | | | | | | | | | | | | | | |
|---|---|---|---|---|---|---|---|---|---|---|---|---|---|---|---|
| A(8:0) | 000 | 01D | 1CD | 09B | 101 | 0AB | 178 | 00A | 180 | 1A1 | 001 | | | | |
| X(8:0) | 000 | 01A | 123 | 04A | 012 | 13D | 0A8 | 167 | 11A | 16F | 112 | | | | |
| S5(2:0) | 0 | | 6 | | 0 | | 6 | | 1 | | 6 | | | | |
| AT0(10:0) | 000 | 01D | 7CD | 09B | 701 | 0AB | 778 | 00A | 780 | 7A1 | 001 | | | | |
| BT0(10:0) | 000 | 03A | 79A | 136 | 602 | 156 | 6F0 | 014 | 700 | 742 | 002 | | | | |
| ATT(10:0) | 7FF | 7E2 | 764 | 0FE | 087 | 7F5 | 0FE | 7EB | 0FF | 0BD | 7FD | | | | |
| BTT(10:0) | 7FF | 7C5 | 065 | 6C9 | 1FD | 6A9 | 10F | 7EB | 0FF | 0BD | 7FD | | | | |
| CT(10:0) | 000 | 032 | | | 000 | 754 | 000 | 7F5 | 05E | 7FE | | | | | |
| TMP5(10:0) | 000 | 033 | | | 000 | 755 | 778 | 7F6 | 080 | 05F | 7FF | | | | |

… 1

BOOTH ENCODER IN A BINARY MULTIPLIER

FIELD OF THE INVENTION

The present invention relates to a binary multiplier; and more particularly, to an improved Booth encoder for use in a binary multiplier.

DESCRIPTION OF THE PRIOR ART

In digital systems, multiplication of two binary numbers is done in the same manner as multiplication of decimal numbers. This process consists of examining the successive bits of a multiplier, beginning with the least significant bit ("LSB") of the multiplier. If the multiplier bit is a "1", a multiplicand is copied down to produce a partial product; if it is a "0", zeros are written down to produce a partial product. The partial products written down in successive lines are shifted one position to the left relative to the previous line. When all the multiplier bits have been examined, the partial products in the successive lines are added to produce a final product. Such a process generates a partial product per each multiplier bit; and, therefore, is rather time consuming and requires a complex hardware.

In digital applications such as digital signal processors which demand high speed performance, various methods for reducing the number of partial products have been proposed. One of the methods is a Booth's algorithm wherein a radix-2 multiplier X is recoded into a radix-4 multiplier Z with an encoded digit set, $\{-2, -1, 0, 1, 2\}$, to thereby reduce the number of partial products to one half.

Such reduction can be obtained through a recoding process wherein three bits in the multiplier X are grouped in an overlapped fashion and one digit of the encoded digit set, $\{-2, -1, 0, 1, 2\}$, is allotted to each bit group. Each encoded digit in the encoded digit set determines the necessary multiple of a multiplicand A. Following is a description of the recoding process to examine three bits of a binary multiplier X, e.g., "10001101", at a time starting from a dummy bit placed to the right of the least significant bit ("LSB") of the multiplier, called the string (Booth's) recoding wherein two neighboring groups of three bits have one overlapping bit, with the rightmost being $X_1 X_0 (X_{-1})$, the next one being $X_3 X_2 X_1$, and so on with $(X_{-1})$ representing the dummy bit "0":

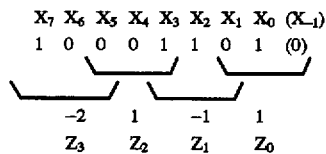

The above recoding scheme is summarized in Table I.

TABLE I

| Booth's Recoding | | | | |
|---|---|---|---|---|
| $X_{n+1}$ | $X_n$ | $X_{n-1}$ | Z | operation |
| 0 | 0 | 0 | 0 | |
| 0 | 0 | 1 | 1 | multiple of A |
| 0 | 1 | 0 | 1 | multiple of A |
| 0 | 1 | 1 | 2 | two multiples of A |
| 1 | 0 | 0 | -2 | two's complement of 2A |
| 1 | 0 | 1 | 1 | multiple of A |

TABLE I-continued

| Booth's Recoding | | | | |
|---|---|---|---|---|
| $X_{n+1}$ | $X_n$ | $X_{n-1}$ | Z | operation |
| 1 | 1 | 0 | -1 | two's complement of A |
| 1 | 1 | 1 | 0 | |

However, a conventional binary multiplying device employing Booth's algorithm necessitates a need to find the multiple or the complement of the multiplicand, which causes a time delay. Such speed limitation makes the conventional binary multiplying device less suitable for use in a high speed digital system.

SUMMARY OF THE INVENTION

It is, therefore, an object of the present invention to provide an improved binary multiplying device adapted for high speed multiplication.

It is another object of the present invention to provide a partial product generator capable of performing a multiplication in a simple fashion in the multiplying device.

In accordance with the present invention, there is provided a binary multiplier device for multiplying a parallel n-bit binary multiplier and a parallel m-bit binary multiplicand wherein n and m are positive integers, respectively, which comprises: means, having n/2, if n is=-even, or n+½, if n is odd, number of partial product generating means, for multiplying the n bits in the multiplier with the m bits in the multiplicand to produce n/2, if n is even, or (n+1)/2, if n is odd, partial products; means for grouping the n-bit binary multiplier together with a dummy bit placed to the right of the least significant bit ("LSB") of the n-bit binary multiplier into n/2, if n is even, or (n+1)/2, if n is odd, data groups of three bits grouped in a string starting from the dummy bit position, two neighboring groups of said n/2 or (n+1)/2 data groups having an overlapping bit therebetween, wherein each of the data groups is provided to each of the partial product generating means; means for adding the n/2 or the (n+1)/2 partial products to produce a final partial product and a carry partial product therefor; and means for adding the final partial product and the carry partial product to produce a final product, wherein said each of the partial product generating means includes:

first extension means for extending the m-bit multiplicand by a parallel m+2 bit binary number, ATO, wherein the two extending bits in said ATO are copied twice from the most significant bit ("MSB") in the m-bit multiplicand and placed to the left of the MSB; second extension means for extending the m-bit multiplicand by a parallel m+2 bit binary number, BTO, wherein one of the two extending bits in said BTO is copied from the MSB in the m-bit multiplicand and placed to the left of the MSB, and the other is a binary number "0" placed to the right of the LSB; a first inverter for inverting the m+2 bit binary number ATO from the first extension means to produce an inverted m+2 bit binary number, ATT; a second inverter for inverting the m+2 bit binary number BTO from the second extension means to produce an inverted m+2 bit binary number, BTT; a first multiplexer, in response to a data group provided thereto, for selectively outputting one of the inverted m+2 bit binary number ATT and the inverted m+2 bit binary number BTT, wherein the three bits of the data group are used as a selection code for the selective outputting operation; means for logically adding a binary digit "1" to the selected output from the first multiplexer to produce an m+2 bit binary number, CT+1; and a second multiplexer, in response to the data group, for selectively outputting one of the m+2 bit binary number ATO, the m+2 bit binary number BTO and the m+2 bit binary number CT+1, the selected output from the second multiplexer being a partial product for said each of the partial product generators.

BRIEF DESCRIPTION OF THE DRAWINGS

The above and other objects and features of the present invention will become apparent from the following description of preferred embodiments, when taken in conjunction with the accompanying drawings, in which:

FIGS. 4A to 4E provide exemplary simulation data executed by the partial product generator.

DETAILED DESCRIPTION OF THE PREFERRED EMBODIMENTS

Figure 1:
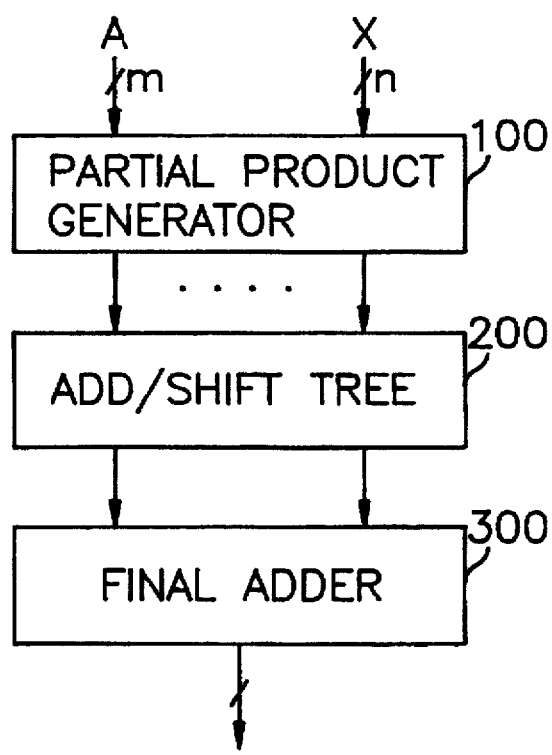
FIG. 1 illustrates a schematic block diagram of a binary multiplying device in accordance with the invention.

Referring to FIG. 1, there is shown a schematic block diagram of a binary multiplying device for multiplying a parallel n-bit binary multiplier X and a parallel m-bit binary multiplicand A wherein n and m are positive integers, respectively, in accordance with the invention. The multiplying device comprises a partial product generator 100, an add/shift tree 200 and a final adder 300. The partial product generator 100 multiplies the n bits in the multiplier X with the m bits in the multiplicand A to produce n/2 partial products (if n is even) or (n+1)/2 partial products (if n is odd).

Figure 2:
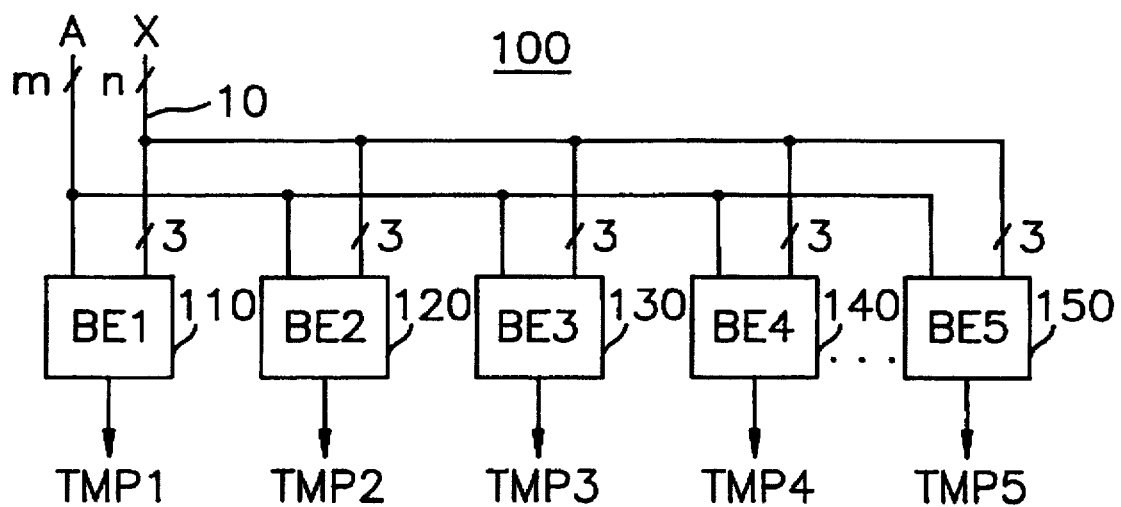
FIG. 2 shows a detailed block diagram of the partial product generator shown in FIG. 1.

As can be seen from FIG. 2, the partial product generator 100 includes n/2 (if n is even) or (n+1)/2 (if n is odd) Booth encoders (BEs); and, among them, only five encoders 110, 120, 130, 140 and 150 are illustratively shown therein. At a net 10, a dummy bit "0" is placed to the right side of the LSB of the parallel n-bit binary multiplier X to obtain n+1 bits. And then, the n+1 bits of the binary number are divided into n/2 (if n is even) or (n+1)/2 (if n is odd) data groups starting from the dummy bit position, each data group having three bits in an overlapping fashion as described above. Assuming now that the binary multiplier X is (000011010) of 9-bit length, the 9-bit binary multiplier X is grouped into five data groups, S1, S2, S3, S4 and S5 as follows:

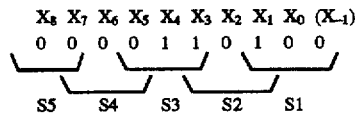

wherein ($X_{-1}$) represents the dummy bit.

Sometimes the binary number may not have a sufficient number of bits to form a full number of groups of three bits. In such cases, one or two 0's are placed to the left of the MSB of the binary number to fill out the last group.

The five data groups S1, S2, S3, S4 and S5 are provided to the five Booth encoders 110, 120, 130 140 and 150, respectively. Each of the data groups is used as a selection code in each of the Booth encoders, which will be further described with reference to FIG. 3. Each of the Booth encoders 110, 120, 130 140 and 150 receives the m-bit multiplicand A and each one of the data groups derived from the n-bit multiplier X to produce a partial product.

The five partial products from the partial product generator 100 are added up by the add/shift tree 200 to produce a final partial product and a carry partial product therefor. The final adder 300 adds the final partial product and the carry partial product from the add/shift tree 200 to produce a final product.

Figure 3:
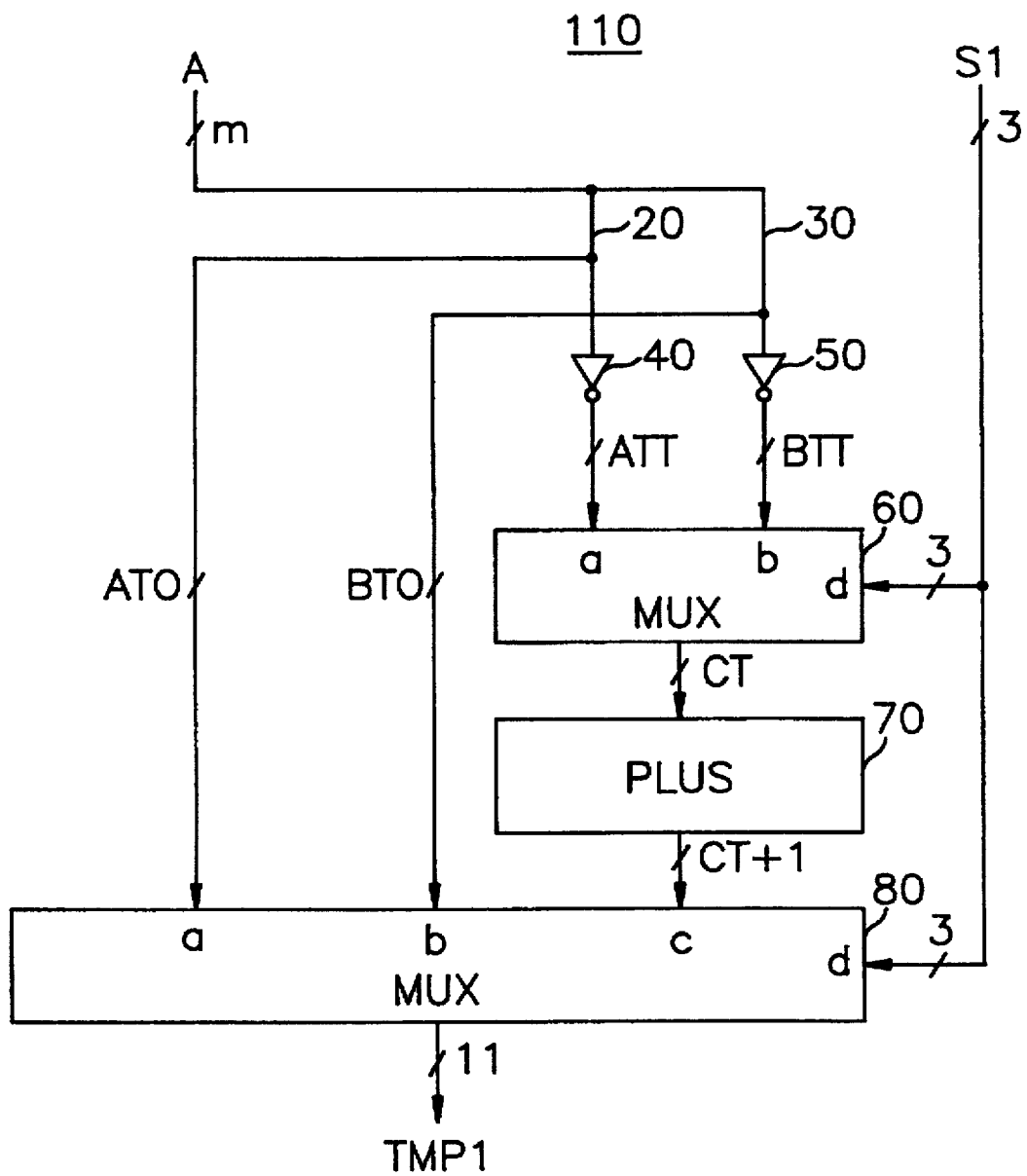
FIGS. 3 represents a detailed block diagram of the Booth's encoder shown in FIG. 2.

FIG. 3 illustrates the detailed circuit diagram of one, e.g., 110, of the Booth encoders 110, 120, 130, 140 and 150, all of which have the same construction, shown in FIG. 2.

On a net 20, a digit is copied twice from the MSB in the parallel m-bit multiplicand A and the copied two digits are added to the left of the MSB to extend the m-bit multiplicand A by a parallel m+2 bit binary number, ATO. This operation corresponds to that of the encoded digit "1" derived from the Booth recoding process as described above.

In addition, on a net 30, a digit is copied from the MSB in the m bit multiplicand A and placed to the left of the MSB to extend the m-bit multiplicand A by a parallel m+1 bit binary number; and then a binary "0" is placed to the right of the LSB of the m+1 bit the binary number to extend the m-bit multiplicand A by a parallel m+2 bit binary number, BTO. This operation corresponds to that of the encoded digit "2" derived from the Booth recoding process as described above.

The m+2 bit binary number ATO is provided to a first inverter 40 which produces an inverted parallel m+2 bit binary number, ATT, and a first input terminal "a" of a three-input multiplexer 80. The m+2 bit binary number BTO is provided to a second inverter 50 which produces an inverted parallel m+2 bit binary number, BTT, and a second data input terminal "b" of the three-input multiplexer 80.

The inverted m+2 bit binary number ATT and the inverted m+2 bit binary number BTT are supplied to a first and a second data input terminals "a" and "b" of a two-input multiplexer 60, respectively.

On the other hand, a first three-bit data group, S1, e.g., 100, is provided to each selection input "d" of the two-input multiplexer ("MUX") 60 and the three-input multiplexer ("MUX") 80. The first three-bit data group S1 applied to each of the multiplexers 60 and 80 is used as the selection code that determines which input is to be transmitted therefrom. In this way, the two-input MUX 60, in response to the three-bit data group S1, selectively outputs one of its inputs, i.e., the inverted m+2 bit binary number ATT and the inverted m+2 bit binary number BTT. This operation is summarized in the following TRUTH TABLE I.

| TRUTH TABLE I | |
|---|---|
| S (selection code) | CT (output) |
| 0 0 0 | 0 |
| 0 0 1 | 0 |
| 0 1 0 | 0 |
| 0 1 1 | 0 |
| 1 0 0 | b |
| 1 0 1 | a |
| 1 1 0 | a |
| 1 1 1 | 0 |

It can be seen from the TRUTH TABLE I that the m+2 bit binary number BTT is selected as the output CT of the two-input MUX 60.

The selected output, i.e., the m+2 bit binary number CT from the two-input MUX 60 is then supplied to a plus "1" logic circuit 70. At the plus "1" logic circuit 70, a binary digit "1" is logically added to the selected output CT to produce a m+2 bit binary number, CT+1. This operation corresponds to those of the encoded digits "−1" and "−2" derived from the Booth recoding process as described above.

The m+2 bit binary number CT+1 from the plus "1" logic circuit 70 is then provided to a third input terminal "c" of the three-input MUX 80. In a similar fashion to the one used in case of two-input MUX 60, the three-input MUX 80 selectively outputs one of its inputs, the m+2 bit data ATO, the m+2 bit data BTO and the added m+2 bit data CT+1 in response to the three-bit data group S1. This operation is summarized in TRUTH TABLE II.

TRUTH TABLE II

| S (selection code) | TMP (output) |
|---|---|
| 0 0 0 | 0 |
| 0 0 1 | a |
| 0 1 0 | a |
| 0 1 1 | b |
| 1 0 0 | c |
| 1 0 1 | c |
| 1 1 0 | c |
| 1 1 1 | 0 |

It can be seen from the TRUTH TABLE II that the m+2 bit binary number CT+1 is selected as the output TMP1 of the three-input MUX 80.

As a result, the three-input MUX 80 generates an m+2 bit binary number, TMP1, which is the partial product for the Booth encoder 110.

FIGS. 4A to 4E depict the simulation results executed by the Booth encoders 110, 120, 130, 140, 150, respectively, wherein a hexadecimal representation is used to illustrate the operation of the Booth's encoders. For example, in FIG. 4A, when the multiplier X is "000011101" of 9-bit length or "01D" in a hexadecimal notation and the multiplicand A is "000011010" of 9-bit length or "01A" in a hexadecimal notation as shown in second column of data strings, the ATO becomes "00000011101" or "01D"; the BTO becomes "00000111010" or "03A"; the ATT becomes "11111100010" or "7E2"; and the BTT becomes "11111000101" or "7C5". And then, when S1 is "100", the CT becomes the value, i.e., "7C5", of the BTT and finally the TMP1 becomes "7C6", which is the partial product for the Booth encoder 110.

Although the present invention has been shown and described with respect to the particular embodiment only, it will be apparent to those skilled in the art that many changes and modifications may be made without departing from the spirit and scope of the present invention as defined in the appended claim.

What is claimed is:

1. A binary multiplier device for multiplying a parallel n-bit binary multiplier and a parallel m-bit binary multiplicand wherein n and m are positive integers, respectively, which comprises:

means, having n/2, if n is even, or n+1/2, if n is odd, number of partial product generating means, for multiplying the n bits in the multiplier with the m bits in the multiplicand to produce n/2, if n is even, or (n+1)/2, if n is odd, partial products;

means for grouping the n-bit binary multiplier together with a dummy bit placed to the right of the least significant bit ("LSB") of the n-bit binary multiplier into n/2, if n is even, or (n+1)/2, if n is odd, data groups of three bits grouped in a string starting from the dummy bit position, two neighboring groups of said n/2 or (n+1)/2 data groups having an overlapping bit therebetween, wherein each of the data groups is provided to each of the partial product generating means;

means for adding the n/2 or the (n+1)/2 partial products to produce a final partial product and a carry partial product therefor; and means for adding the final partial product and the carry partial product to produce a final product, wherein said each of the partial product generating means includes:

first extension means for extending the m-bit multiplicand by a parallel m+2 bit binary number, ATO, wherein the two extending bits in said ATO are copied twice from the most significant bit ("MSB") in the m-bit multiplicand and placed to the left of the MSB;

second extension means for extending the m-bit multiplicand by a parallel m+2 bit binary number, BTO, wherein one of the two extending bits in said BTO is copied from the MSB in the m-bit multiplicand and placed to the left of the MSB, and the other is a binary number "0" placed to the right of the LSB;

a first inverter for inverting the m+2 bit binary number ATO from the first extension means to produce an inverted m+2 bit binary number, ATT;

a second inverter for inverting the m+2 bit binary number BTO from the second extension means to produce an inverted m+2 bit binary number, BTT;

a first multiplexer, in response to a three bit data group provided thereto, for selectively outputting one of the inverted m+2 bit binary number ATT and the inverted m+2 bit binary number BTT, wherein the three bits of the data group are used as a selection code for the selective outputting operation;

a plus "1" logic circuit for logically adding a binary digit "1" to the selected output from the first multiplexer to produce an m+2 bit binary number, CT+1; and a second multiplexer, in response to the three bit data group, for selectively outputting one of the m+2 bit binary number ATO, the m+2 bit binary number BTO and the m+2 bit binary number CT+1, the selected output from the second multiplexer being a partial product for said each of the partial product generators.

* * * * *